United States Patent [19]

Saczawa, Jr.

[11] 4,022,505
[45] May 10, 1977

[54] ENERGY ABSORBING CELLULAR MEDIA FOR VEHICLES

[75] Inventor: John S. Saczawa, Jr., Anderson, Ind.

[73] Assignee: General Motors Corporation, Detroit, Mich.

[22] Filed: Nov. 28, 1975

[21] Appl. No.: 636,209

[52] U.S. Cl. .................. 293/71 R; 267/139; 293/70

[51] Int. Cl.² ........................ B60R 19/08

[58] Field of Search ........... 267/136, 139, 140; 114/219; 188/1 C; 217/35; 293/1, 60, 62, 66, 70, 71 R, 71 P, 73–78, 80, 81, 89, 96–99

[56] References Cited

UNITED STATES PATENTS

| | | | |
|---|---|---|---|
| 2,728,479 | 12/1955 | Wheeler | 217/35 |
| 3,374,495 | 3/1968 | Joyce | 293/71 R X |
| 3,645,575 | 2/1972 | Slavney | 267/140 X |
| 3,684,272 | 8/1972 | Ticknor | 267/140 |
| 3,687,502 | 8/1972 | Loew | 293/1 |
| 3,768,850 | 10/1973 | Barton et al. | 293/71 P |
| 3,869,167 | 3/1975 | Muller | 267/140 X |
| 3,926,463 | 12/1975 | Landwehr et al. | 293/1 X |

FOREIGN PATENTS OR APPLICATIONS 1,035,216  8/1953  France ............... 293/71 R Primary Examiner—Johnny D. Cherry
Attorney, Agent, or Firm—Charles R. White

[57] ABSTRACT

This energy absorbing cellular media for vehicles and vehicle bumpers comprises at least two sections of resilient plastic material each having a plurality of longitudinally extending cells formed from a deep latticework of intersecting walls. The two sections are attached to each other by a live hinge at the front or rearward extremity of the media to permit the sections to be relatively turned so that the cells of one section are disposed at an angle with respect to the cells of the other section for installation on a support. The sections and live hinge are injection molded in one operation with cells parallel to each other to facilitate their manufacture and subsequent removal from the mold.

3 Claims, 6 Drawing Figures

ENERGY ABSORBING CELLULAR MEDIA FOR VEHICLES

This invention relates to energy absorption and more particularly to a resilient energy-absorbing plastic media for vehicles having at least two sections with longitudinally extending cells and pivotally interconnected by live hinge means to permit the sections to be relatively turned so that the cells of one section can be oriented at angle with respect to the cells of the other section for improved absorption of impact energy.

Resilient energy absorbing devices comprising a plurality of longitudinally extending cells with common walls employed in vehicles and vehicle bumpers prior to this invention have been generally effective to absorb low speed impact energy. The walls of the cells of these devices, when impacted by a force generally aligned therewith, buckle and twist to dissipate impact energy. After impact, the walls slowly recover toward their original configuration. Generally the cells of these prior devices are parallel to the longitudinal axis of the vehicle and accordingly energy absorption and protection from straight-ahead impacts have been greater than energy absorption and protection from corner impacts which are generally directed at an angle with respect to longitudinal axis of the vehicle. To provide for improved protection for corner impact, some prior cellular energy absorbing units have had varied cell size and increased cell wall thickness in the corner areas of the units to resist side loading and crushing of the affected cells. While such prior constructions have proved to be reliable and highly beneficial in dissipating the energy of corner impacts, they generally have not taken optimum advantage of the cellular construction and its ability to maximize energy absorption.

Accordingly, it is a feature, object and advantage of this invention to provide a new and improved energy absorbing cellular media for vehicles which incorporates at least two sections interconnected by live hinge means to permit the media to be mounted on a support so that the cells of one section are disposed at an angle with respect to the cells of a second section and are respectively oriented toward different impact loads such as corner and straightahead impact loads.

Another feature, object and advantage of this invention is to provide a new and improved resilient cellular energy absorbing media comprising at least two sections each having parallel cells formed from a latticework of intersecting walls and with the sections interconnected by integral hinge means to permit the angular orientation of the sections with respect to each other so that the cells of one section will have a directional orientation different from the directional orientation of the cells of another section.

These and other features, objects and advantages of this invention will be more apparent from the following detailed description and drawing, in which.

Figure 1:
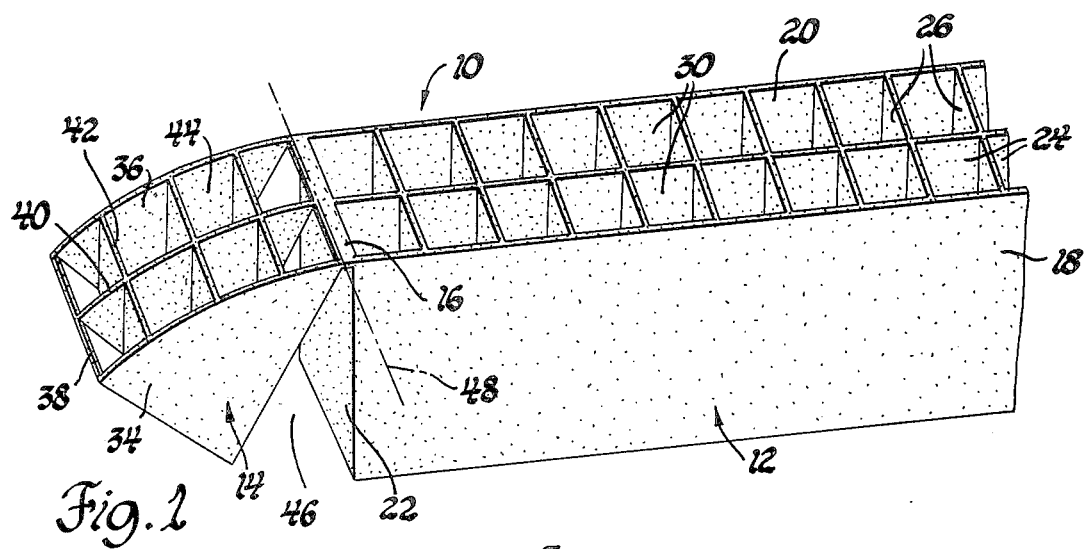
FIG. 1 is a perspective view of a portion of the energy absorbing media of this invention in a first position.
Figure 2:
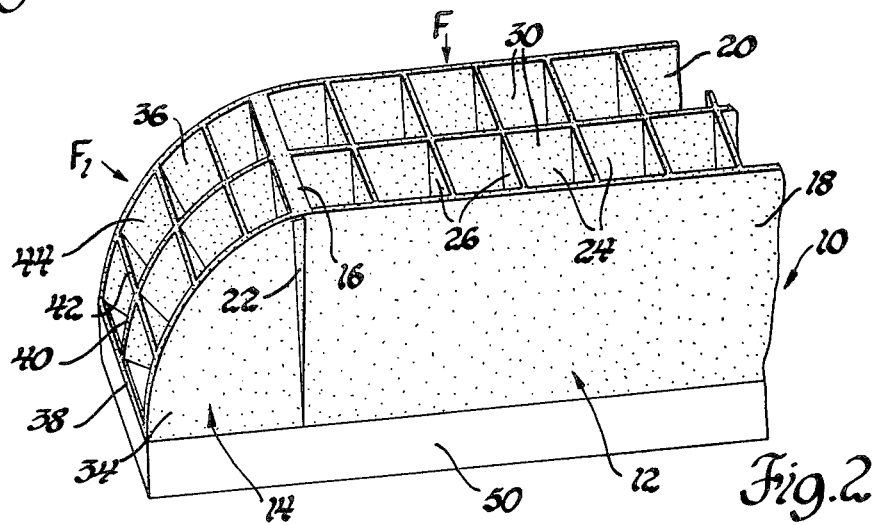
FIG. 2 is a perspective view of the energy absorbing media of this invention as installed on a bumper beam or other support.

Turning now in greater detail to the drawing, there is shown in FIGS. 1 and 2 resilient thermoplastic energy absorbing media 10 comprised of at least two sections 12 and 14 that are pivotally interconnected by a live hinge 16. Section 12 has a rectangular open-box configuration with side walls 18 and 20 and with end walls of which only end wall 22 is illustrated. The end and side walls of section 12 cooperate with a latticework of intersecting internal vertical walls 24 and 26 to form a plurality of longitudinally extending rectilinear cells 30. Section 14 is generally sector or pie shaped and has side walls 34, 36 and a terminal end wall 38. Vertical walls 40 and 42 interior of the outer walls of section 14 intersect one another to form a plurality of longitudinally extending rectilinear cells 44. As shown and described in connection with the injection molding of media 10, section 14 has no end wall adjacent to the end wall 22 of section 12 although in the mold position the end surfaces of the cells walls of section 14 progressively recede from end wall 22 from its connection with live hinge 16. Thus, as shown in FIG. 1, a wedge-shaped clearance 46 is provided between the adjacent ends of sections 12 and 14 which has its apex formed by the live hinge 16. The live hinge construction permits the sections 12 and 14 to be turned relative to each other and the clearance allows section 14 to be turned on axis 48 from the FIG. 1 to the FIG. 2 position, whereby the cellular media may be mounted on a substantially rigid support such as a bumper beam 50. Suitable fasteners or other securing means may be employed to attach the cellular media to the bumper beam. A shell-like flexible facia may be mounted over the media to provide a finished appearance if desired.

In the FIG. 2 position, the cells 30 of section 12 are generally parallel to the longitudinal axis of the vehicle (not shown) to provide energy absorption of direct front or rear impacts F by the buckling and twisting of the side walls forming the cells. Corner impacts such as $F_1$ to the bumper assembly. generally directed at an angle with respect to the longitudinal axis of the vehicle, will similarly be absorbed by the cells 44 of the sector 14 which are substantially aligned with the direction of such impacts. After minor impacts such as a 5 mph vehicle impact the cells gradually recover their original shape with only minor permanent deformation or other damage resulting.

Figure 3:
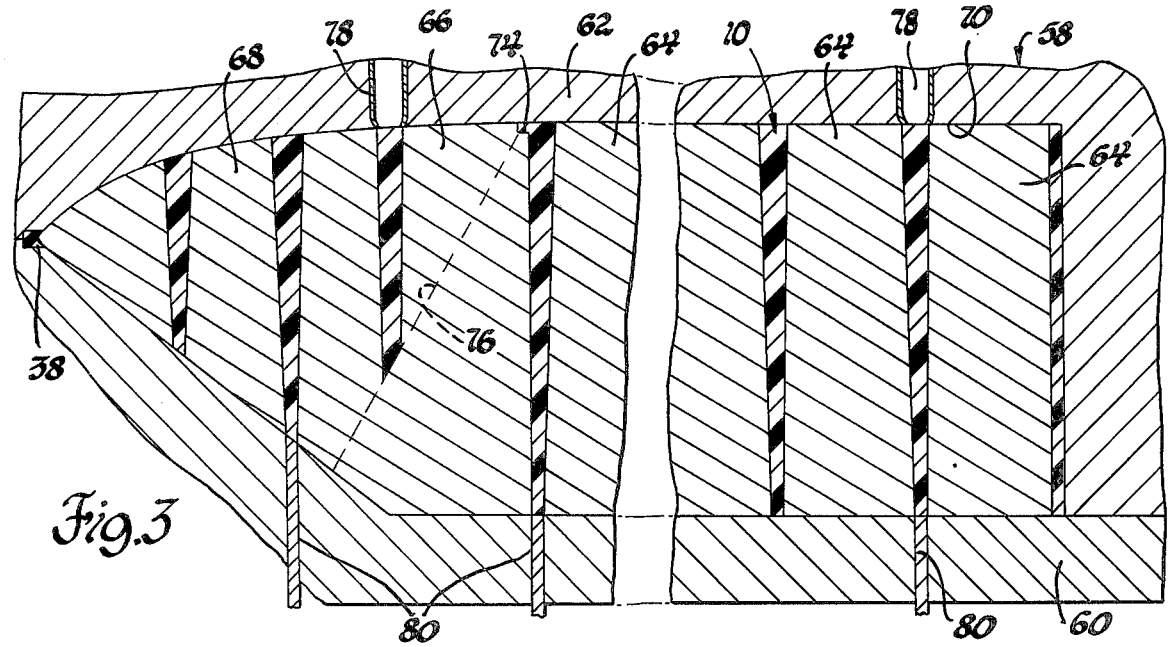
FIG. 3 is a cross-sectional view of a mold with energy absorbing media formed therein.

It will be appreciated that in the mold position shown in FIGS. 1 and 3, the cells 44 of section 14 and cells 30 of section 12 are parallel to each other which facilitates their formation and subsequent removal from the mold hereinafter described. FIG. 3 illustrates a preferred process for making the energy absorbing media of this invention and shows a mold 58 comprising an ejector half 60 and a cover half 62 which are relatively movable axially from the illustrated or closed position for molding the media to an open position (not shown) for removal of the media from the mold. The ejector half 60 of the mold supports a plurality of fingerlike cores 64, 66 and 68 that are spaced from each other and extend into a cavity 70 formed in the cover half 62 of the mold. The tips of the majority of the cores contact the corresponding end wall of the cover half of the mold so that cells are open at both ends. If desired clearance can be provided between the tips of some of the cores and the cavity so that end walls can be formed on the cells. Such end walls are formed to accommodate attachment devices for securing the media to the bumper beam 50 and for securing a flexible covering facia to the media. The cores 66 forming the endmost cells of section 12 adjacent to section 14 are relieved at 74 along their upper edges facing section 14 to provide a mold space for the live or flexible hinge 16. Cores 66 also have inclined side surfaces 76 to form the wedge shaped clearance 40 between sections 12 and 14.

The cores are tapered and separated to provide wall spaces for heated and liquefied thermoplastic materials which is injected from nozzles 78 provided in the cover half 62. After appropriate cooling of the thermoplastic material, the cover half is moved axially outwardly with respect to the ejector half 60 of the mold. Pins 80, mounted for axial movement in the ejector half, are actuated and stroked outwardly to push the molded energy absorbing media 10 from the ejector half 60. Since the cores extend in the same direction and parallel cells are formed in the media ejection of the media is facilitated. As best shown in FIG. 3 the cell walls taper from a maximum width at their outer surface to a minimal width at their inner or mounting surfaces. With this construction deformation would initially occur at the thinner wall portion of the cells when impacted.

Figure 4:
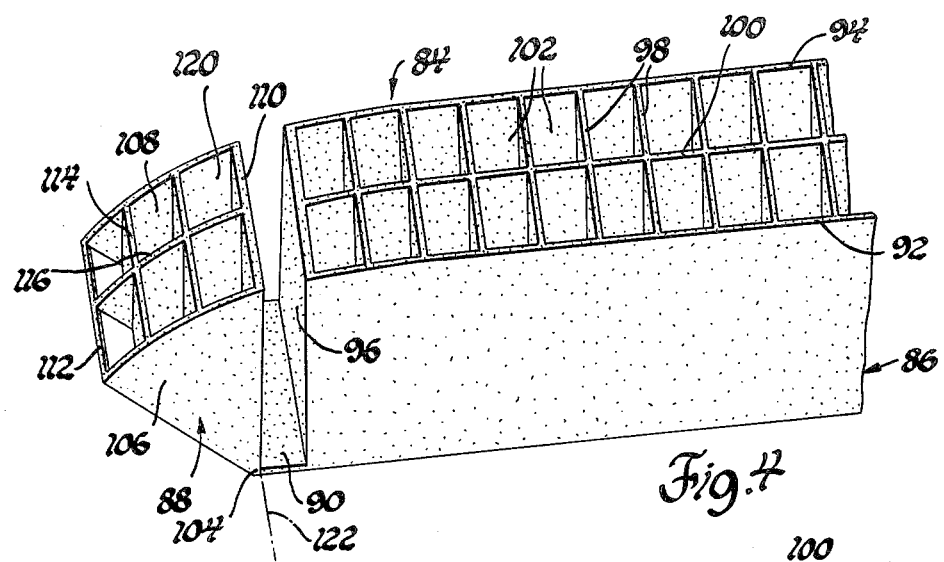
FIG. 4 is a perspective view of another embodiment of this invention in a first or mold position.
Figure 5:
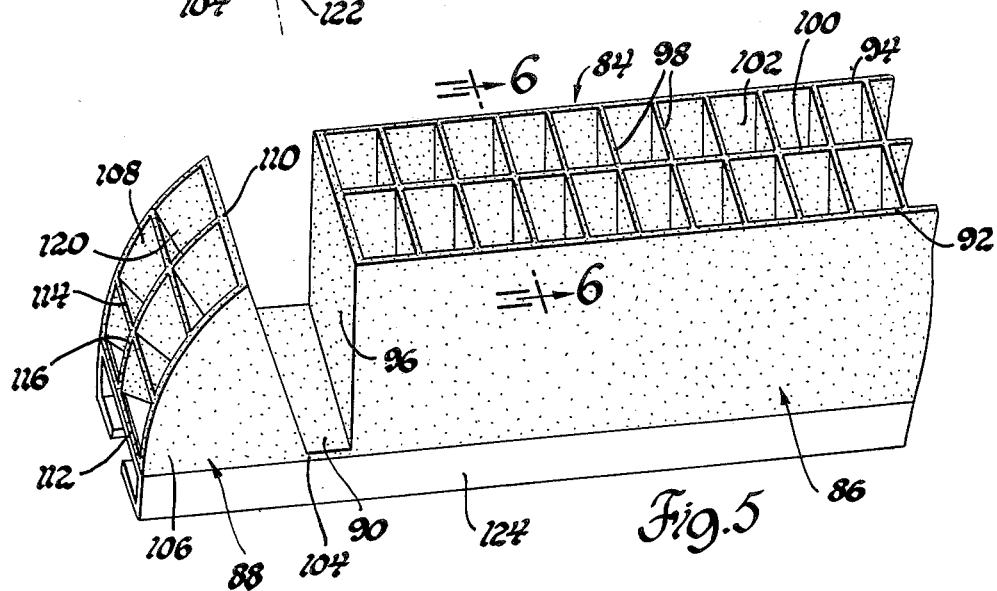
FIG. 5 is a perspective view of the energy absorbing media of FIG. 4 as installed position on a support.
Figure 6:
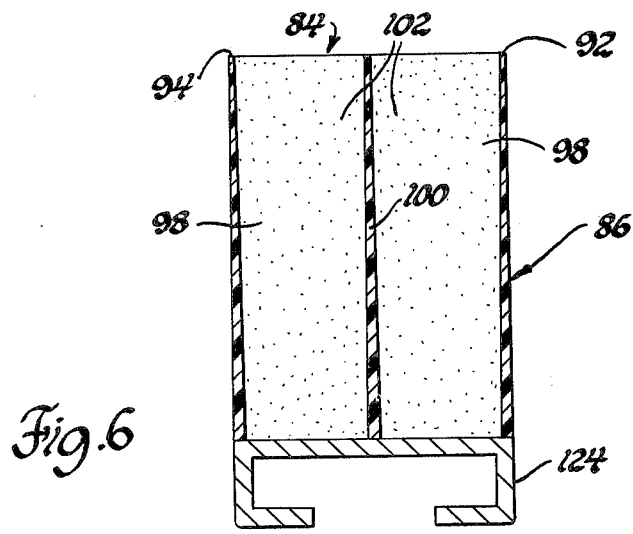
FIG. 6 is a cross-sectional view taken along line 6—6 of FIG. 5.

Another embodiment of the invention is shown in FIGS. 4-6 and comprises multicelled thermoplastic energy absorbing media 84 having at least two sections 86 and 88 which are pivotally interconnected by an integral live hinge 90. Section 86 has a rectangular box-like configuration with side walls 92 and 94 and end walls such as shown at 96. Intersecting vertical walls 98 and 100 internal of the side and end walls form elongated open cells 102. Section 88 is generally sector or pie shaped as illustrated in FIGS. 4 and 5. The live hinge 90 extends laterally from the lower extremity of end wall 96 of section 86 to the apex 104 of the pie shaped section 88. Section 88 has side walls 106, 108 and end walls 110 and 112. The walls 114 and 116 internal of the side and end walls intersect one another to provide a plurality of rectilinear cells 120.

The live hinge 90 provides a pivot axis 122 permitting the section 88 to be turned from the mold position of FIG. 4 to the position of FIG. 5 in which the unit is seated and suitably retained on an elongated bumper beam 124 which may be a channel of steel, fiberglass or other suitable material. As in the first embodiment the cells of the energy absorbing media extend in the same general direction when in the mold position to facilitate manufacture. In the installed position the cells 102 of section 86 are disposed at an angle with respect to the cells of the section 88. With the cells of section 88 angularly directed outwardly the media is set for improved absorption of the energy of a corner impact as in the first embodiment of the invention described above. With the live hinge formed on the back side of the energy absorbing unit, the media of this embodiment further differentiates from that of FIGS. 1 and 2 by having walls with a draft angle that gradually diminishes from the base end to the outer end as shown in FIG. 6. With this construction impact would cause greater deflection of the thin outer portion of each of the walls of the cells instead of the thicker inner portions. It will be appreciated that the energy absorbing unit of FIGS. 4-6 is preferably made by the process described in connection with the embodiment of FIGS. 1 and 2 with appropriate changes in the mold.

Although the media has been described as having two hinged sections it will be appreciated that any suitable number of sections may be connected by integral hinge means and mounted on flat, angular or curved support surfaces. While preferred embodiments and a preferred process have been shown and described for purposes of illustrating this invention, other embodiments and processes embodying the concepts of this invention may be adapted such as fall within the scope of the appended claims.

I claim:

1. A resilient one piece energy absorbing grid of plastic material for a vehicle bumper, a rigid support having a planar surface for supporting said grid, said grid comprising first and second grid portions disposed adjacent to each other, each of said grid portions having a plurality of longitudinally extending cells extending in a first axial direction and having common walls therebetween, live hinge means interconnecting said first and second portions adjacent to one end thereof and forming a pivot axis therefor, said portions being spaced from one another so that said portions can be turned relative to one another on said pivot axis and mounted on said planar surface whereby the axial orientation of said cells of one of said portions is varied with respect to the axial orientation of the cells of the other of said portions and with respect to said planar surface.

2. A vehicle bumper comprising a rigid bumper beam having a planar outer surface and a resilient one piece energy absorbing grid of plastic mterial for absorbing the energy of predetermined impacts, said grid comprising first and second open celled grid portions disposed adjacent to each other, each of said grid portions having a plurality of longitudinally extending cells extending in a first axial direction and having common walls therebetween, said cells of said first portion having a depth greater than said cells of said second portion, live hinge means integral with and interconnectng said first and second portions at one end thereof to permit said portions to be turned with respect to each other on an axis formed by said hinge means and mounted on said planar surface of said bumper beam so that the axial orientation of said cells of one of said first portion is varied with respect to the cells of said second portion and extends in a second axial direction oblique to said first axial direction to thereby maximize absorption of energy of an impact load directed in said second axial direction onto said second portion.

3. A vehicle bumper comprising a rigid bumper beam having a flat and continuous outer support surface and a resilient one piece energy absorbing grid of molded plastic material for absorbing the energy of predetermined impacts comprising first and second open celled grid portions disposed adjacent to each other, each of said grid portions having a block of longitudinally extending cells extending in a first axial direction and having common walls therebetween, said first portion having a cubical configuration and said second portion having a three dimensional sector-like configuration, said cells of said first portion having a forward surface spaced from said support surface and having cells of a depth greater than said cells of said second portion, said cells of said second portion terminating in a curved outer surface extending from a station adjacent to the outer surface of said first portion to a station adjacent to said support surface of said bumper beam, live hinge means at one end of said grid integral with and interconnecting said first and second portions along an axis transverse to said first axial direction, a space between said portions permitting said portions to be turned with respect to each other on said axis extending through said live hinge means and mounted on said flat outer surface of said bumber beam so that the axial orientation of said cells of one of said portions can be varied with respect to the cells of the other of said portions to extend in a second axial direction oblique to said first axial direction and to said outer support surface to thereby maximize absorption of energy of a corner impact load directed in said second axial direction.

* * * * *